Patented Jan. 2, 1940

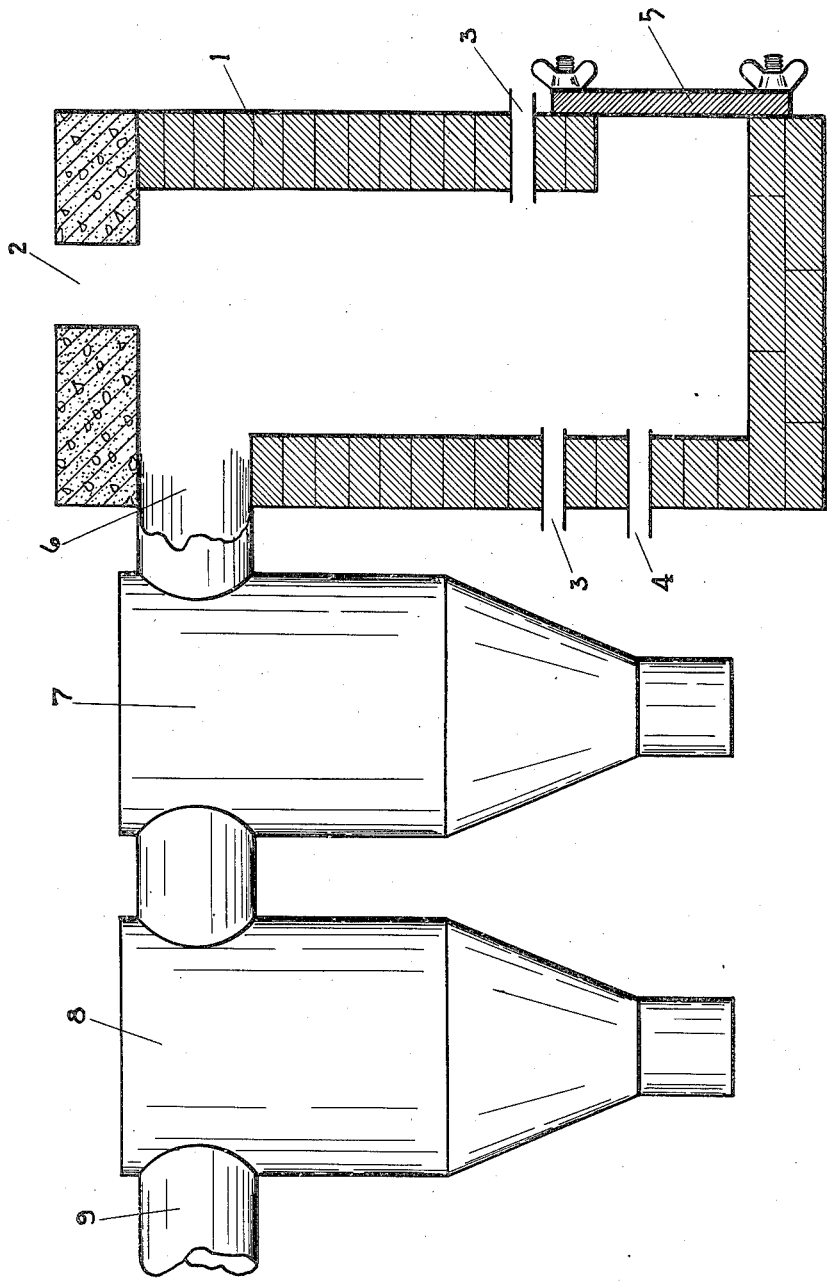

2,185,218

UNITED STATES PATENT OFFICE 2,185,218

TREATMENT OF CHROMIUM ORES

Irving E. Muskat, Akron, and Norman Howard, Barberton, Ohio, assignors to Pittsburgh Plate Glass Company, Allegheny County, Pa., a corporation of Pennsylvania Application December 20, 1938, Serial No. 246,838

22 Claims. (Cl. 75—112)

This invention relates to the chlorination of chromium containing substances, such as chromium ores, for example, chromite ore. This invention is particularly adapted to the treatment of materials wherein the chromium concentration is substantial, generally in excess of 10 percent by weight and preferably in excess of 20 percent. In the chlorination of such ores, it is often found that the ore in the interior of the chlorinating furnace sinters and bridges to such an extent that continued operation becomes extremely difficult if not impossible. In accordance with our invention, we have found that the plugging or bridging may be prevented thus permitting continuous or substantially continuous operation by introducing into the chlorinating furnace a quantity of oxygen or an oxygen compound capable of supplying oxygen to the reaction.

We have found that the bridging or plugging is due, in part at least, to the formation of chlorine compounds which soften or melt at the temperature of treatment but which do not readily volatilize. These softened chlorides, oxychlorides or other chlorine compounds tend to agglomerate the ore and to form a solid sintered mass in the furnace, thus preventing continuous operation. For example, magnesium, which is a common constituent in many chromium ores, is converted to compounds containing magnesium and chlorine which soften or melt with consequent plugging of the furnace. The plugging may be produced or complicated by other additional factors which as yet have not been determined. We have found, however, that upon exposure of the ore to the action of both chlorine and oxygen, the tendency towards bridging is substantially eliminated. In addition, the formation of undesirable chlorine containing substances of high boiling point may be substantially minimized and thus the loss of chloride through formation of such chlorides is thereby prevented since these materials remain in the residue generally in the form of oxides, though occasionally as oxychlorides. The avoidance of undesirable chloride formation may be due to decomposition of the chlorides by oxygen or oxygen compounds to form corresponding oxides after the chlorides are formed or to the fact that the objectionable chlorine compounds are not formed in the presence of oxygen.

The process may be conducted at a temperature sufficient to insure formation of volatile chromium chloride which may be removed from the furnace and subsequently condensed. In such cases, other common constituents of chromium ores, such as iron may be simultaneously removed with the chromium as mixed chloride vapors and the chromium chloride separated from the remaining chlorides by fractional condensation. If desired, however, the process may be conducted at temperatures below that at which chromium chloride vaporizes in which case lower boiling point chlorides, such as ferric chloride may be vaporized and removed while the chromium chloride is produced in the solid state. This chromium chloride may be subsequently vaporized in the presence or absence of further chlorine if desired.

In general, it is found desirable to chlorinate a mixture of ore and carbon or other suitable reducing agent. The ore may be of any convenient size or form but is preferably finely ground, for example, to minus one-hundred mesh and is then mixed with a suitable carbonaceous product, such as coal coke, petroleum coke, charcoal or coal. The mixture may then be treated with chlorine as such or may be preliminarily briquetted prior to chlorination.

The amount of oxygen to be introduced is dependent to some degree upon the temperature of treatment and the amount of carbon present. In addition, it is governed by the amount of impurities, such as magnesium, calcium, barium, strontium, or other metallic agent capable of forming a chloride which softens or melts during chlorination. In general, concentrations of oxygen above about 3 percent by volume of the chlorinating gas used has been found to be satisfactory. Concentrations of oxygen substantially in excess of this value may be used, but it is preferred that the amount of oxygen used should not substantially exceed the amount of chlorine or similar agent since otherwise the chlorine in the furnace will be so diluted that maintenance of the temperature of reaction may be difficult. Preferably, the amount of chlorine should comprise not substantially less than 20 percent of the total gas introduced into the chlorination chamber. The use of pure oxygen is not necessary since air may be introduced into the furnace with excellent results. From one to four volumes of air per volume of chlorine have been used with success. The chlorine and air or oxygen may be separately introduced into the furnace or the gases may be mixed beforehand.

The process may be conducted in any convenient apparatus, such as a rotary kiln, a shaft furnace or a roasting oven. These furnaces may be externally heated if necessary. We have found it convenient to make use of a shaft furnace and in general, the process may be conducted in a manner such that the heat of the reaction maintains the desired temperature without application of external heat. In order to initiate the process, the furnace may be preheated in a convenient manner and when it has been heated to a desired temperature, for example, about 500° C., an initial charge of ore may be introduced. This initial charge may consist of a mixture of carbon and briquettes containing carbon and ore. Sufficient oxygen or air and chlorine are introduced to ignite the carbon and to initiate the chlorination reaction. Further charges of briquettes and carbon may be introduced as the reaction proceeds. When the temperature exceeds about 700° C. it is found that the chlorination reaction occurs with such rapidity and with sufficient evolution of heat that the temperature may be maintained without addition of heat from external sources. Where the charge is brought up to temperature partly or entirely by external heating, after such heating is reached, external heating may be discontinued.

The accompanying drawing diagrammatically illustrates a suitable apparatus for conducting the process in accordance with our invention. This apparatus comprises a suitable shaft furnace 1, which may be constructed from firebrick or other resistant material and which is provided with chlorine tuyères 3, and one or more oxygen tuyères 4, and is connected to a series of condensers 7 and 8. In the ordinary operation of this furnace a charge of coke may be introduced into the furnace, a blast of oxygen introduced through the tuyères 4, and the coke ignited. When the temperature has reached a suitable value, for example, 850° C., a charge of ore and carbon briquettes may be introduced through furnace inlet 2, which is then closed by a suitable cover (not shown). At this time chlorine is introduced into the furnace and the oxygen and chlorine flow rates adjusted in accordance with the amount of ore introduced. Additions of ore may be either continuous or intermittent. The base of the furnace is provided with a suitable door or other closure 5, at which ash and unchlorinated ore may be withdrawn continuously or intermittently. The iron and chromium chlorides which volatilize are withdrawn through outlet pipe 6, and may be led to a heated condenser 7, where chromic chloride is condensed and thence to a cool condenser 8, where iron chloride is separated. The exhause gases are withdrawn through conduit 9, to a scrubbing tower (not shown) for the purpose of removing suspended solids therefrom.

In order to maintain the process in continuous operation, it is preferred to introduce the iron, carbon, chlorine and oxygen at such a rate that the temperature is maintained above 700° C., preferably at 850–1150° C. Ordinarily, this may be done by regulating the rate of introduction of carbon-ore mixtures or briquettes in accordance with periodic or continuous observation of the temperature in the reactor. Thus, if the temperature begins to decrease, the rate of introduction of the chlorine and/or air and of the ore-carbon mixture may be increased while if the temperature increases, the rate of ore, carbon and chlorine or air introduction may be decreased. The temperature also may be regulated to some degree by controlling the rate of withdrawal of the chlorinated residue since a large amount of heat may be dissipated by rapid removal of the residue and the reactor cooled by the cool incoming ore. If desired, a further control of the temperature may be effected by control of the amount of air or oxygen and chlorine which is introduced into the reactor. Thus, for a given amount of carbon in a charge, a small increase in chlorine concentration may increase the rate of reaction while a small increase in air or oxygen concentration may tend to retard the reaction.

If difficulty is encountered in maintaining the temperature by the heat of the chlorination reaction, carbon lumps may be added to the reaction zone with or without a charge of briquettes and air or oxygen introduced to burn sufficient carbon to raise the temperature to the desired value. In addition, briquettes containing an increased concentration of carbon may be added. Occasionally, the heat developed during the reaction is so great that the temperature of the reaction zone is too high for practical operation. The reaction may be cooled, if desired, by introduction of a diluent gas such as nitrogen or carbon dioxide. Carbon dioxide appears to be particularly effective as a cooling gas in the reaction. Since substantially uniform results may be secured throughout the range of 850–1150° C., considerable latitude in temperature regulation may be permissible so long as the temperature remains within this range.

The temperature to be maintained is governed by the nature of the process to be conducted. Thus, where it is desired to operate in a manner such that chromium chloride is volatilized, it is found preferable to maintain the temperature not substantially less than 750° C. On the other hand, if it is desired to prevent volatilization of the chromium chloride and to volatilize such materials as iron chloride, the temperature may be maintained at about 400° C. to 600° C. Operation at the lower temperatures may necessitate application of heat in order to maintain the reaction. This may be done by application of external heat or by introduction of coal or coke into the furnace along with air or oxygen.

The carbon concentration in the ore-carbon mixture may be varied in accordance with the amount of oxygen introduced into the furnace and upon the composition of the ore. With high concentrations of air correspondingly high concentrations of carbon are generally desirable while with lower air concentrations, the carbon concentration may be correspondingly low. The carbon concentration is also governed by the amount of chromium and iron in the ore since with high chromium and iron concentrations, the carbon should be correspondingly high and with lower concentrations of these metals, the carbon required is correspondingly low. Carbon in excess of 10 percent is generally found desirable. In treating chromium ores such as chromite which contain 35 to 55 percent $Cr_2O_3$ for vaporization of both iron and chromium chlorides, it is found that optimum results may be obtained by introducing 8 to 25 percent by weight of carbon based upon the weight of the ore and 5 to 20 percent of oxygen by volume based upon volume of chlorine introduced.

The following example is illustrative:

*Example I*

A quantity of briquettes ¼ to 1 inch in diameter were prepared from a mixture of 100 parts by weight of ore, 12 parts by weight of ground coke, 8 parts by weight of sawdust and 12 parts by weight of molasses by firing at 500° C. until the volatile hydrocarbons were substantially removed. The carbon content of the briquettes was about 17 percent of the weight of the briquettes. The ore contained 42.6% $Cr_2O_3$, 22% FeO and 12.1% MgO.

A shaft furnace, having an internal diameter of 10 inches was preheated by a coke fire within the shaft at 1000° C. At this time a charge of briquettes were added and chlorine and oxygen were introduced into the base of the shaft to initiate the chlorination reaction. The process was carried on continuously for many hours by introducing briquettes at a rate of 0.22 kg. per minute, chlorine at a rate of 150 liters per minute and oxygen at the rate of 10 liters per minute. The temperature remained at about 1000° C. throughout the reaction, and the chloride vapors given off were recovered and condensed to recover chromium and ferric chloride. No tendency toward bridging within the furnace was noted during the run. In a similar run, under the conditions set forth in this example with the sole exception that no oxygen was introduced, bridging occurred to such an extent that it was necessary to suspend operation only a few minutes after the process was begun.

Hydrogen chloride, phosgene or other gaseous chlorinating agents may be used in conjunction with chlorine or in lieu thereof in accordance with our invention.

While the process has been described with reference to the use of elemental oxygen or air, other compounds capable of releasing oxygen or of reacting with the undesirable chlorides to form oxides may also be used in conjunction with or in lieu of air or oxygen. For example, steam, manganese dioxides, perchlorates, such as potassium perchlorate, peroxides and the like, may be introduced into the chromium residue.

Similarly, the process is not limited to treatment of ores but is applicable to other chromium concentrates particularly those containing magnesium, calcium or other alkaline earth metals, such as waste alloy compositions, metallic residues, ferrochrome, chrome pigment compositions or other residues containing substantial amounts of this metal. In general, it is preferred to treat materials containing upward of 10 percent chromium and preferable in excess of 20 per cent chromium.

Although this invention has been described with reference to specific details of certain embodiments thereof, it is not intended that such details shall be regarded as limitations upon the scope of the invention except insofar as included in the accompanying claims.

We claim:

1. In the process of chlorinating a chromium ore at a temperature sufficient to volatilize iron chloride, the step which comprises conducting the chlorination of the ore in the presence of sufficient gaseous oxygen to substantially minimize the tendency of the ore toward sintering within the furnace.

2. The process of treating a chromium ore at a temperature sufficient to volatilize iron chloride, which comprises treating said ore with a chlorinating agent in a suitable chamber to produce a substantial quantity of chromium chloride, and minimizing the formation of chlorine compounds other than those of iron and chromium by introducing a quantity of oxygen into the chlorination chamber during the treatment.

3. The process of treating a chromium ore containing magnesium which comprises treating said ore with a chlorinating agent in a suitable chamber to produce a substantial quantity of the chromium chloride, and minimizing the formation of compounds containing magnesium and chlorine by introducing a quantity of oxygen into the chlorination chamber during the treatment.

4. The process of treating chromite ore containing magnesium which comprises treating said ore with a chlorinating agent in a suitable chamber to produce a substantial quantity of the chromium chloride, and minimizing the formation of compounds containing magnesium and chlorine by introducing a quantity of oxygen into the chlorination chamber during the treatment.

5. The process of treating a chromium ore, which comprises treating a mixture of ore and carbon with a chlorinating agent in a suitable chamber at a temperature sufficiently high to volatilize iron chloride and to produce a substantial quantity of the chromium chloride, and minimizing the formation of chlorine compounds other than those of iron and chromium by introducing a quantity of oxygen into the chlorination chamber during the treatment.

6. The process of treating a chromium ore containing magnesium, which comprises treating a mixture of ore and carbon with a chlorinating agent in a suitable chamber to produce a substantial quantity of the chromium chloride, and minimizing the formation of compounds containing magnesium and chlorine by introducing a quantity of oxygen into the chlorination chamber during the treatment.

7. The process of treating chromite ore containing magnesium, which comprises treating a mixture of ore and carbon with a chlorinating agent in a suitable chamber to produce a substantial quantity of the chromium chloride, and minimizing the formation of compounds containing magnesium and chlorine by introducing a quantity of oxygen into the chlorination chamber during the treatment.

8. The process of treating chromite ore, which comprises treating a mixture of ore and carbon with a chlorinating agent in a suitable chamber at a temperature sufficiently high to volatilize iron chloride and to produce a substantial quantity of the chromium chloride, and minimizing the formation of chlorine compounds other than those of iron and chromium by introducing a quantity of oxygen into the chlorination chamber during the treatment, maintaining the temperature sufficiently high to volatilize chromium chloride and recovering the chromium chloride.

9. A continuous process of chlorinating an iron-chromium ore which comprises chlorinating a mixture of carbon and ore in a reaction zone, and introducing chlorine, carbon, oxygen and ore into the reaction zone at such a rate that sufficient heat is evolved from the reaction to maintain the temperature in excess of 700° C. within at least a portion of the reaction zone without externally heating the furnace within which said reaction zone is disposed.

10. A continuous process of chlorinating chromite ore containing magnesium which comprises chlorinating a mixture of carbon and ore in a reaction zone, and introducing chlorine, carbon, oxygen and ore into the reaction zone at such a rate that sufficient heat is evolved from the reaction to maintain the temperature in excess of 700° C., within at least a portion of the reaction zone without externally heating the furnace within which said reaction zone is disposed.

11. A continuous process of chlorinating chromite ore containing magnesium which comprises chlorinating a mixture of carbon and ore in a reaction zone, and introducing chlorine, carbon, oxygen, and ore into the reaction zone at such a rate that sufficient heat is evolved from the reaction to maintain the temperature in excess of 700° C., within at least a portion of the reaction zone, without externally heating the furnace within which said reaction zone is disposed, whereby chromium chloride is vaporized and removing the chromium chloride vapor, the amount of oxygen introduced being sufficient to substantially minimize formation of compounds containing magnesium and chlorine.

12. A method of chlorinating chromite ore which comprises treating a charge comprising carbon and briquettes containing carbon and ore with chlorine and oxygen, at a temperature above 700° C., whereby vaporized chromium chloride is formed and removing the vapors of chromium chloride, the amount of oxygen introduced being sufficient to substantially minimize the bridging.

13. In the process of chlorinating a chromium ore at a temperature sufficient to volatilize iron chloride, the step which comprises conducting the chlorination of the ore in the presence of an oxygen compound capable of reacting with metallic chlorides to form oxides in an amount sufficient to substantially minimize the tendency of the ore toward sintering.

14. The process of treating a chromium ore which comprises treating said ore with a chlorinating agent in a suitable chamber at a temperature sufficiently high to volatilize iron chloride and to produce a substantial amount of chromium chloride, and minimizing the formation of high boiling compounds of chlorine by introducing into the chlorination chamber a sufficient quantity of a compound capable of liberating oxygen at the temperature of operation into the chlorination chamber during the treatment.

15. In the process of chlorinating a chromium containing substance at a temperature sufficient to volatilize iron chloride, the step which comprises conducting the chlorination of said substance in the presence of an oxygen compound capable of reacting with metallic chlorides to form oxides in an amount sufficient to substantially minimize the tendency of said substance toward sintering.

16. A method of chlorinating chromite ore which comprises treating a charge comprising carbon and briquettes containing carbon and ore with chlorine and oxygen, at a temperature above 700° C., whereby vaporized iron chloride is formed and removing the vapors of iron chloride; the amount of oxygen introduced being sufficient to substantially minimize the bridging.

17. A process of chlorinating an iron-chromium ore which comprises introducing a mixture of ore and carbon into the upper portion of a shaft furnace, introducing a chlorinating agent into said furnace, maintaining the temperature of chlorination within the furnace sufficiently high to volatilize iron chloride, and introducing a quantity of oxygen into a lower portion of the furnace in an amount sufficient to substantially minimize the tendency of the ore to sinter.

18. A continuous process of chlorinating a chromite ore which comprises introducing the ore into an upper portion of a furnace and contacting the ore with chlorine at a temperature sufficiently high to volatilize iron and chromium chlorides and to form a residue containing nonvolatile chlorides which normally tend to sinter the ore within the furnace and introducing oxygen into a lower portion of the furnace in an amount sufficient to decompose the nonvolatile chlorides within the furnace whereby sintering within the furnace is substantially minimized.

19. A continuous process of chlorinating a chromite ore which comprises introducing the ore into an upper portion of a furnace and contacting the ore with chlorine at a temperature sufficiently high to volatilize iron and chromium chlorides and to form a residue containing nonvolatile chlorides which normally tend to sinter the ore within the furnace and introducing an oxygen compound which is capable of reacting with said chlorides to form oxides into a lower portion of the furnace in an amount sufficient to decompose the nonvolatile chlorides within the furnace whereby sintering within the furnace is substantially minimized.

20. A process of chlorinating an iron-chromium ore which comprises introducing a mixture of ore and carbon into the upper portion of a shaft furnace, introducing a chlorinating agent into said furnace, maintaining the temperature of chlorination within the furnace sufficiently high to volatilize iron chloride, and introducing a quantity of an oxygen compound which is capable of reacting with magnesium chloride to form the oxide thereof into a lower portion of the furnace in an amount sufficient to decompose the nonvolatile chlorides within the furnace whereby sintering within the furnace is substantially minimized.

21. In the process of chlorinating a chromium-iron bearing material which normally sinters during chlorination at a temperature sufficiently high to volatilize iron chloride, the step which comprises conducting the chlorination of the ore in the presence of at least 3 percent by volume of gaseous oxygen based upon the volume of the chlorinating agent, whereby sintering is substantially minimized.

22. A method of initiating and conducting the reaction between chlorine and an iron-chromium ore which comprises introducing carbon into a reactor, introducing oxygen at a controlled rate to burn at least a portion of the carbon and thereby to heat the interior of the reactor to a temperature not substantially less than 700° C., introducing a mixture of ore and carbon into the reactor, introducing an independently controlled amount of chlorine to initiate the chlorination and continuing the addition of ore, chlorine and carbon at a rate such that the heat evolved by the chlorination of the ore is developed with sufficient rapidity to maintain the temperature within the reactor above 700° C.

IRVING E. MUSKAT.
NORMAN HOWARD.